Sept. 2, 1969  K. E. KISSELL  3,464,116
FOUR-AXIS SATELLITE-TRACKING MOUNT

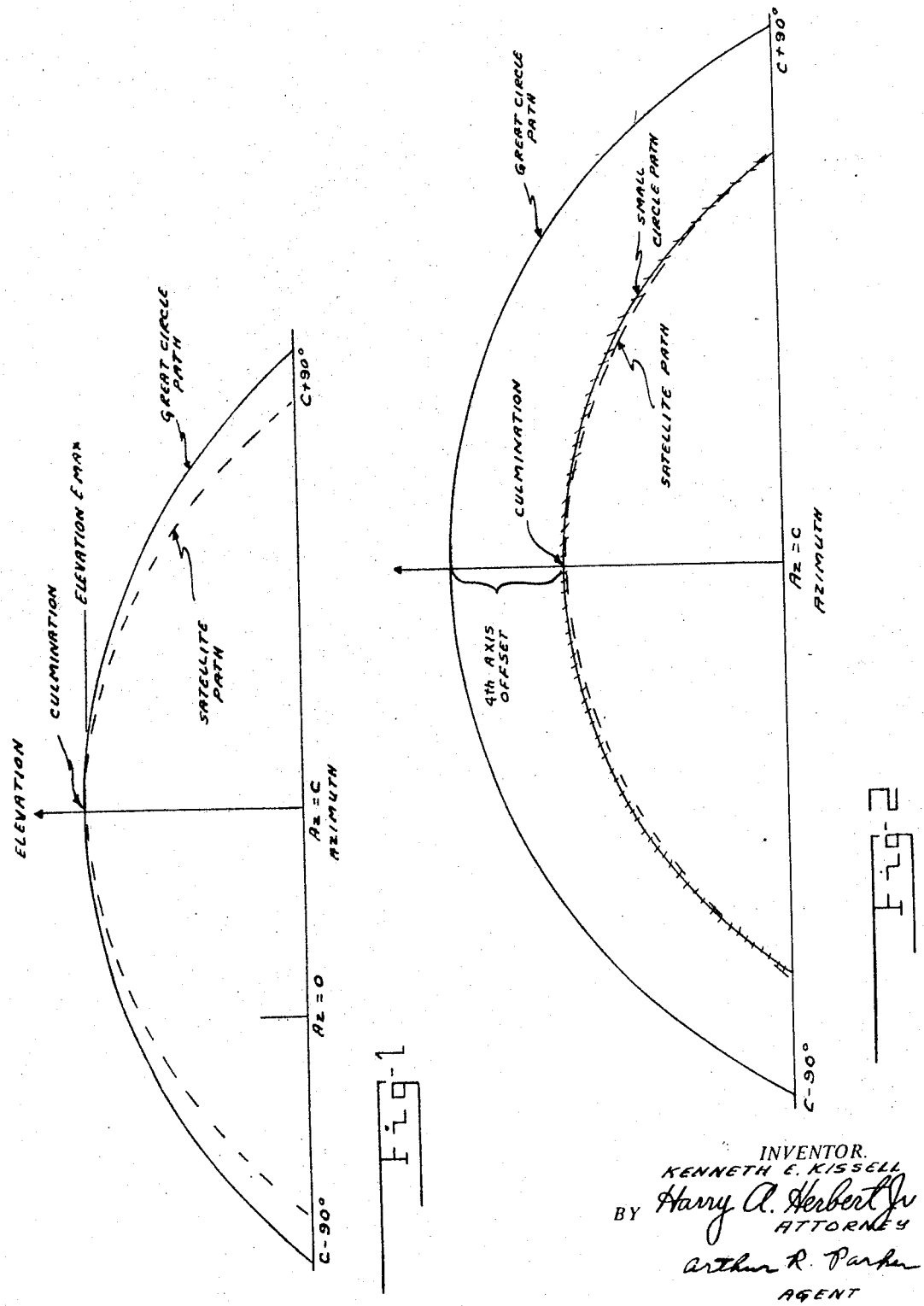

Filed April 6, 1967  4 Sheets-Sheet 3

INVENTOR.
KENNETH E. KISSELL
BY Harry A. Herbert Jr
ATTORNEY
Arthur R. Parker
AGENT Sept. 2, 1969  K. E. KISSELL  3,464,116
FOUR-AXIS SATELLITE-TRACKING MOUNT
Filed April 6, 1967  4 Sheets-Sheet 4

INVENTOR.
KENNETH E. KISSELL
BY Harry A. Herbert Jr
ATTORNEY
Arthur R. Parker
AGENT United States Patent Office 3,464,116
Patented Sept. 2, 1969

3,464,116
FOUR-AXIS SATELLITE-TRACKING MOUNT
Kenneth E. Kissell, Dayton, Ohio, assignor to the United
States of America as represented by the Secretary of
the Air Force
Filed Apr. 6, 1967, Ser. No. 629,874
Int. Cl. G01c 21/02, 17/34
U.S. Cl. 33—61                                    5 Claims

ABSTRACT OF THE DISCLOSURE

A satellite-tracking mount having a base member, a yoke adjustably positioned on said base member, an outer gimbal mounted for rotation on said yoke member an inner gimbal rotatably mounted within said outer gimbal, and a main detection or transmitting instrument positioned for rotation within and relative to said inner gimbal to an offset position.

---

The invention described herein may be manufactured and used by or for the United States Government for governmental purposes without the payment to me of any royalty thereon.

BACKGROUND OF THE INVENTION

This invention relates generally to the field of technology of satellite-tracking mounting in which improved means have been developed for facilitating the continuous aiming of narrow-field cameras, light detectors or transmitters, and narrow-field radio and radar antennas at an orbiting earth satellite.

Previous to the present development, studies of orbiting space vehicles by optical means had been almost entirely limited to astrometry. The geodetic and geophysical sciences have utilized time/position data for studies of oblateness, mass symmetry and outer atmospheric density. However, it has been apparent from the earliest satellite launches that non-spherical satellites may undergo large regular and semiregular changes in brightness as a result of dynamical motions about their centers of mass. Moreover, it has been known that, by use of the technique referred to as photoelectric photometry, such cyclic brightness fluctuations may be utilized to determine both spin axis and spin precession by observations from different sites. For example, many recent satellites, particularly U.S.S.R. carrier rockets, have exhibited high tumble rates producing cyclic brightness fluctuations of several stellar magnitudes in less than 0.5 second, and observations by a rapid-response (5 kc.) photoelectric photometry have yielded good light curves of vehicles brighter than a stellar magnitude of +6.

The investigation of the precision of photoelectric photometry to interpret the detailed shape of the above-referred to light curves led into the study of various tracking mount arrangements for the main detection or transmitting instrument in an effort to improve the quality of such light curves and to ease the difficulties of tracking. The use of photometric data in the determination of spin-axis and vehicle axis orientation requires data on successive transits or on successive days; i.e. taken from differing positions with respect to the vehicle-centered inertial reference frame. In this connection, the apparent trajectories of artificial earth satellites, as viewed from the earth's surface, vary both in shape and in local sky orientation, as determined by orbit shape, size, inclination of the orbital plane, and relationship of the observer to the orbital plane. For low-altitude satellites, tracking at large-zenith distances is normally required and, even for high-altitude satellites, data at large-zenith distances are necessary to obtain maximum divergence observer/vehicle vectors, although these data could perhaps be obtained at low-elevation of near-zenith transits. However, it has been determined that a large number of such near-zenith transits cannot be expected for a satellite at any given topocentric height except, for coincidental circumstances when the satellite period brings the vehicle over the same geographical region for several successive days. Therefore, it has been concluded that photoelectric photometry of satellites must be conducted at large-zenith distances.

Under the conditions of large-zenith distance of culmination, present tracking methods, including alt-azimuth (two-axis), equatorial, and triaxially-mounted telescopes, proved to be difficult. In this connection, in 1955, the Smithsonian Astrophysical Observatory undertook the tracking of IGY satellites. During this operation, it was early realized that the photographic recording of the Vanguard vehicles would be impossible using fixed cameras inasmuch as the exposure time would be limited to the time required for the diffraction image to translate an emulsion resolution element in the camera focal plane. As a means of reducing the satellite's apparent velocity to a value near zero with respect to the emulsion, the three-axis Baker-Nunn camera was developed. However, this three-axis tracking mount system, which is disclosed in detail in U.S. Patent No. 3,121,605, issued Feb. 18, 1964 to J. Nunn, closely approximates a satellite's motion at only one or two points during the satellite's transit and, except at the culmination point, or point of maximum elevation, a component of satellite motion normal to the camera motion remained.

Since the orbital elements of the satellite and hence its actual path across the sky are imperfectly known, errors will exist in the plane of a tracking camera, for example, in its angular velocity. These errors are of secondary importance in the case of satellite astrometry, since the camera field of view is 5° x 30° with the greater dimension in the direction of motion of the satellite. Depending on the height of the satellite and hence its apparent angular rate, an error of 15 to 150 seconds can be tolerated in the predicted time of culmination with recording of the satellite still assured on the frame. This results from the secondary dependence of the elevation angle of the satellite path on the actual time of the culmination passage.

In the use of the principles of photoelectric photometry, as in the present invention, the satellite image is required to be placed within a small entrance aperture at the focal plane of a narrow-view telescope in order to reduce the sky background to tolerable limits. Although the precision guidance of an equatorial mount, for example, allowing use of apertures of only a few seconds of arc apparent field has utility in the case of stellar photometry, where the aperture is chosen to assure capture of the entire diffraction disk of the star while allowing for seeing variations in the image position, in achieving precise data through means of photoelectric photometry, the much larger and varying rate of a satellite target requires apertures measured in minutes of arc rather than seconds to assure capture of the vehicle during most of its transit. In this connection, the three-axis satellite photometer, which substantially follows or approximates a great circle path, has shown that apertures 3 to 7 minutes of arc are tolerable. Moreover, with the three-axis system, continuous tracking of satellite transits reaching culmination above 60° was relatively easy; however, at elevations below 30°, tracking with the three-axis mount becomes relatively difficult because of the large amounts of cross-track motion necessary to overcome the error built into the great circle path approximation. Thus, the cross-track velocities of the three-axis system have been found to increase markedly for the lower transits thereby seriously limiting the continuity and duration of the photometric records obtained. Since the signal-to-noise ratio of the target/background is proportional to the square of the diameter of accepted field, any reduction of guiding errors which will allow smaller field apertures will then allow the photometry of fainter satellites. Therefore, the present satellite-tracking mount system to be hereinafter described in detail was developed to achieve small field apertures and hence low sky background/signals and thereby satisfy the need for an improved and more accurate tracking system.

SUMMARY OF THE INVENTION

The principal object of the present invention is, therefore, to provide an improved satellite-tracking mount system more nearly approximating the apparent path of an orbiting satellite.

A further object of the invention resides in the development of a satellite-tracking mount generally improved to facilitate the continuous and more accurate aiming of narrow-field cameras, light detectors or transmitters, and narrow-field radio and radar antennas at an orbiting satellite.

A more specific object of the invention resides in the use of an improved and more accurate tracking mount supporting a main detection or transmitting instrument with a parallelogram-mounted aiming telescope adjustable about a fourth axis to an offset position and designed to subsequently facilitate the finer adjustment of a tracking mount to a path more closely following the apparent path of the orbiting satellite.

Other objects and advantages of the invention will become apparent from the following description taken in connection with the accompanying drawings, in which like reference numerals refer to like characters in the several figures and in which:

BRIEF DESCRIPTION OF THE DRAWINGS

FIG. 1 is a first graph representing the difficulties inherent in fitting the great circle path approximation of the three-axis tracking mount to the apparent path of an orbiting satellite;

FIG. 2 is a second graph illustrating the improvement in satellite tracking inherent in the four-axis mounting system of the present invention;

DESCRIPTION OF THE PREFERRED EMBODIMENT

Referring generally to the drawings, and in particular to FIGS. 1 and 2 thereof, the difficulties encountered with fitting the great circle approximation of the three-axis mount may be compared with the improvement inherent in the small circle path approximation of the four-axis tracking mount of the present invention. In FIG. 1, it is readily apparent that the three-axis system closely approximates the apparent path of the satellite at only one or two points during the satellite transit by moving the main detection of transmitting instrument, in this instance, a camera, on a great circle path tangent to the apparent trajectory of the satellite. Except at the culmination point or point of maximum elevation, there remains a component of satellite motion normal to the camera motion. Thus, it is either this cross-track motion of the image, or a slight mismatch of the tracking rate which represents the ultimate limit in exposure time. Moreover, it has been found that an error of one percent in the matching velocity restricts the gain of the three-axis mount over a fixed camera to 5 stellar magnitudes (from magnitude 8.5 to 13.5 for satellites at rates of 0.1° per second; i.e. ranges of 4,000 to 4,500 km).

By comparison, FIG. 2 illustrates that by providing a means of offsetting the main tracking instrument, in the preferred embodiment, a telescope, by a small amount downward while raising the location of the great circle from 1° to 15°, it becomes possible to reduce the errors of fitting the satellite's trajectory from 10° to as little as 1/10 of a degree in a typical example. This improved feature essentially reduces the motion of the telescope to rotation about a single axis and greatly simplifies the control and guiding functions of the observer-operator, or servosystem controlling the tracking mount so as to boresight the instrument onto a target. The four-axis system of the present invention represented in FIG. 2 performs this improved tracking by approximating a small circle path having a near coincidence with the satellite path at all points in a manner to be explained in more detail hereinafter.

Figure 3:
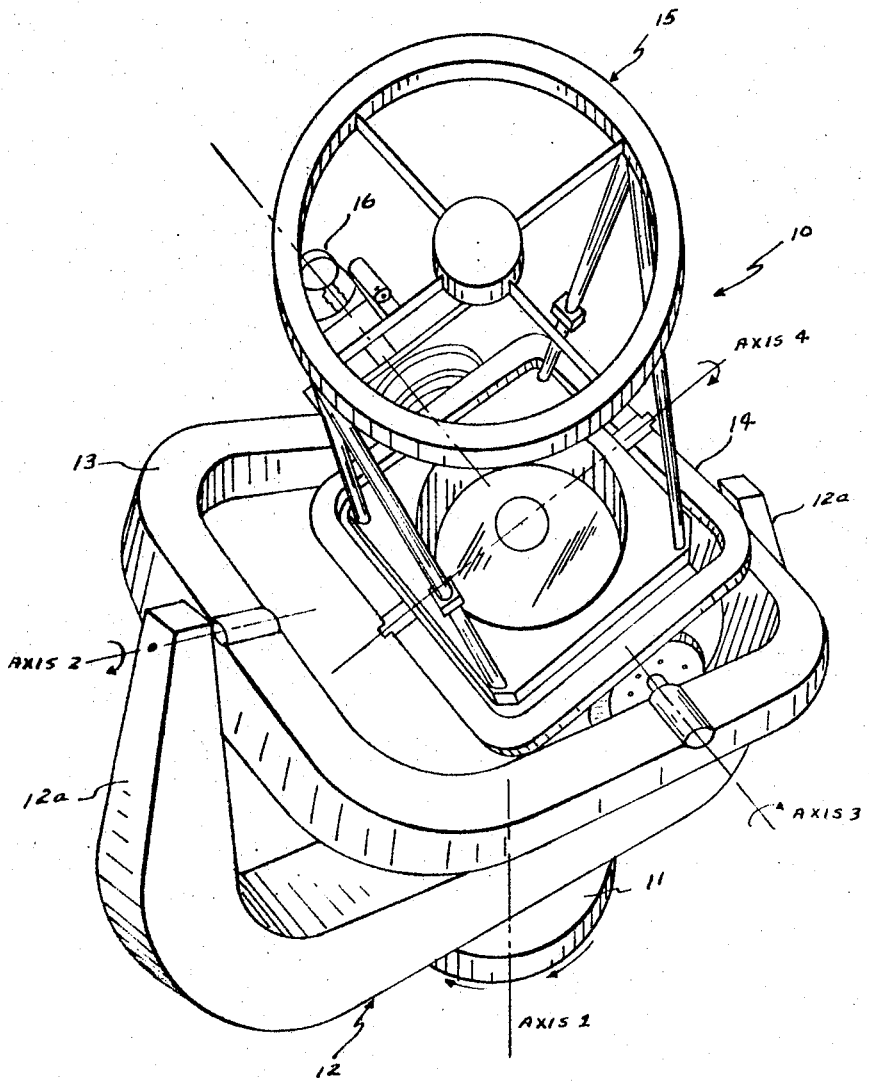
FIG. 3 is a top perspective view, partly schematic, of the four-axis tracking mount of the present invention, illustrating the specific relationship between the various axes utilized to adjust the aiming telescope used in the preferred embodiment thereof to the apparent path of the orbiting satellite.

With particular reference to FIG. 3 of the drawing, the four-axis satellite-tracking mount of the present invention is indicated generally at 10 as including a fixed base element 11, a main yoke member 12, having a pair of upright portions 12a, an outer gimbal 13, and a load-carrying inner gimbal 14. Main yoke member 12 is rotatably positioned on base element 11 for adjustment in azimuth about axis 1, and outer gimbal 13 is rotatably mounted on the upright portions 12a of the main yoke member 12 for adjustment in elevation about axis 2 extending through said upright portions in orthogonal relation to azimuth axis 1. Inner gimbal 14 is rotatably mounted within outer gimbal 13 for adjustment relative thereto about the tracking axis 3, which is orthogonal to elevation axis 2. Mounted within inner gimbal 14 on a fourth axis, indicated as axis 4, orthogonal to trackng axis 3 is the main aiming or guiding telescope indicated generally at 15. Although the telescope 15 is used in preferred embodiment of the invention, other detection or transmitting instruments, as for example, a radio or radar antenna, may be utilized without departing from the true spirit or scope of the invention. If telescope 15 is placed in its neutral or non-offset position, motion of inner gimbal 14 about tracking axis 3 would be orthogonal and would describe a great circle path across the sky, analogous to the three-axis mount. However, with the fourth axis of the present invention incorporated in the tracking mount, the telescope 15 may be adjusted to an offset position and thereby directed to follow a small circle path which has been found to more nearly coincide with the apparent path of the satellite. This operation will be more fully described in more detail hereinafter with particular reference to FIGS. 4 and 5 of the drawings.

Figure 4:
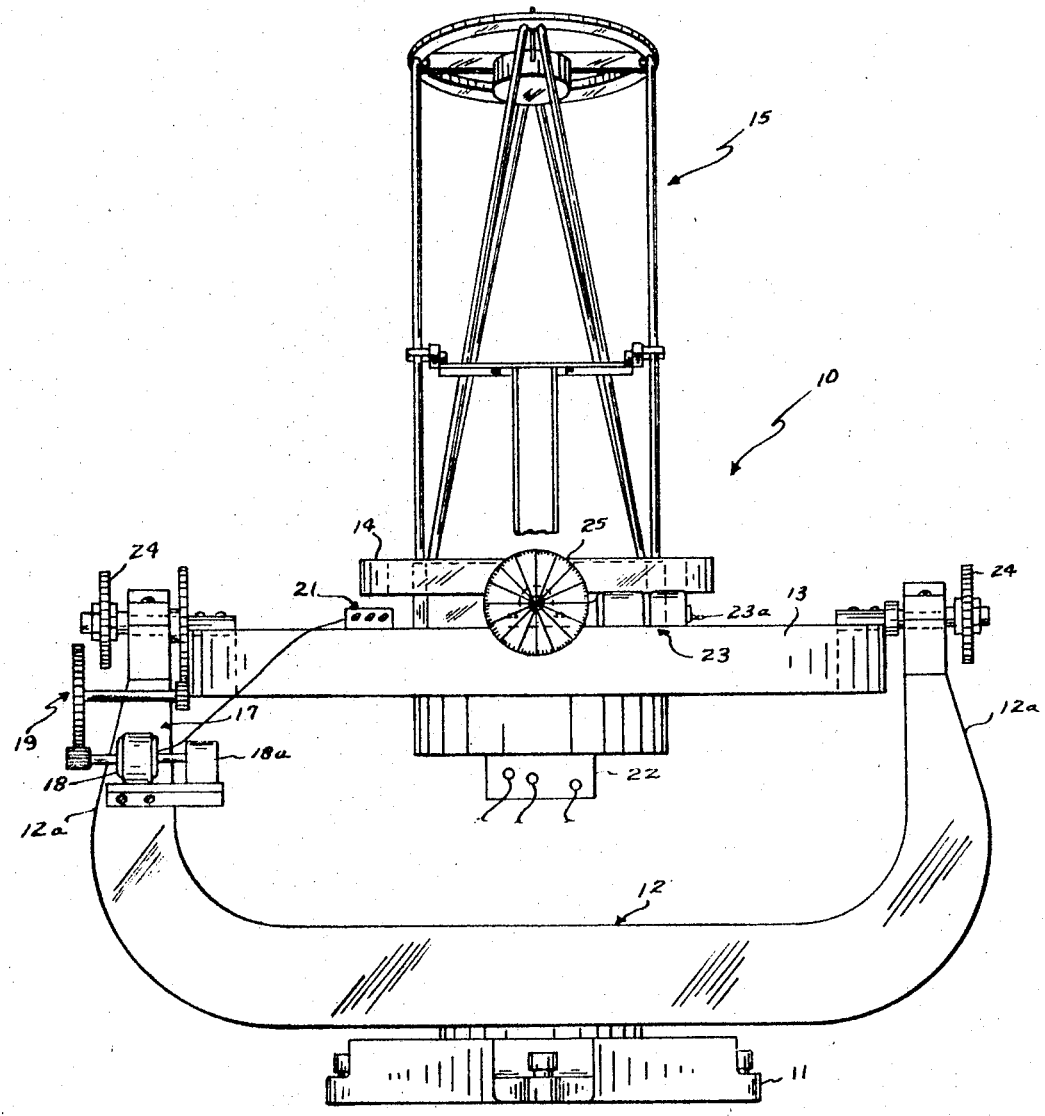
FIG. 4 is a front elevation view of the inventive tracking mount, looking in the direction of the third or tracking axis and illustrating details of the present four-axis system, as seen from the viewpoint of the observer-operator position and with the finder telescope omitted for the sake of clarity.
Figure 5:
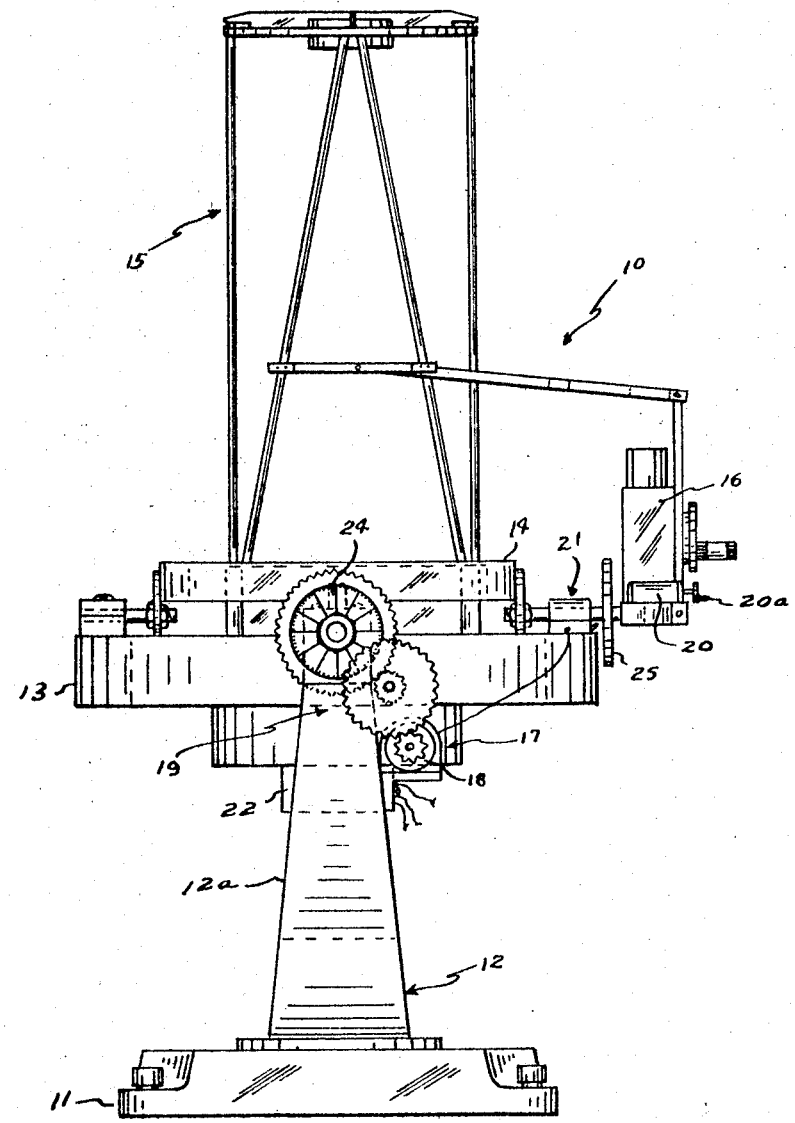
FIG. 5 is a side elevation view looking in the direction of the second or elevation axis and illustrating additional details of the present tracking mount and the adjustment means utilized to align the mount with a particular satellite path.

Referring particularly to FIGS. 4 and 5 of the drawings, a finder telescope 16 is shown attached in parallelogram-relation to the main guiding or aiming telescope 15. The finder telescope 16 may consist of a 5-inch elbow finder scope, designed to provide two turreted eyepieces with 1° and 6° fields, respectively, and is rigidly attached in the aforesaid parallelogram arrangement with the telescope 15 to keep the optical axes of the telescope 15 and the finder 16 in close coincidence over a relatively wide range of motion of the tracking axes. Thus, with use of the finder 16 mounted in parallelogram relation to the guiding or aiming telescope 15, monitoring of the sky field surrounding the target area is facilitated by enabling the observer-operator to provide steering commands to maintain the target on the boresight through means of suitable driving mechanisms on the second or elevation axis 2 and third or tracking axis 3. Offset or fourth axis 4 may also be motorized to even further facilitate accurate tracking of the satellite, although the mount of the present invention does not require it. In either event, the specific driving means for axis 4 is not illustrated or described since it is identical to that for the elevation axis 2 and, moreover, forms no part of the present invention. Nevertheless, a general reference to certain details of the driving mechanism utilized with the inventive mount will be made hereinafter for the sake of clarity only. Furthermore, the specific driving mechanism used with the present mount may be made similar to that described in detail in the previously referred to U.S. Patent No. 3,121,605, issued on Feb. 18, 1964 to J. Nunn.

Referring again to the drawing and particularly to FIG. 3 thereof, tracking mount 10 is initially prepared and boresighted for subsequent tracking operation by manually turning yoke member 12 about azimuth axis 1 to a predetermined position corresponding to data received on a particular satellite, and then locking the mount in place. The outer gimbal 13 is next moved about elevation axis 2 likewise to a predetermined angle approximating the angle of elevation precalculated for the satellite to be tracked, and the telescope 15 is moved in declination about the fourth axis (axis 4), or, in other words, telescope 15 is moved downwardly to a precalculated offset position. At this time, telescope 15 is slewed about tracking axis 3 until a bright star is acquired with the 5-inch finder 16 (note FIGS. 3 or 5), and then in the active aperture of the 24-inch system of the main aiming or guiding telescope 15. In this connection, it is noted that finder 16 is equipped with micrometer adjustments to accurately align or boresight its optical axis with that of the main telescope 15. When a photometer is used as the main detecting instrument, it is mounted to the bottom of main telescope 15, as indicated schematically at 22 in FIGS. 4 and 5. With use of such a photometer, an audio tone frequency modulated by the light intensity of the signal indicates acceptance of the target by the photometer; without the photometer, boresighting is accomplished visually by comparing the image planes of the telescope 15 and finder 16. In this connection, it is noted that the divergence of the two optical axes during a transit rarely exceeds one arc-minute, and is satisfactorily compensated for by the observer-operator. With the finder 16 and telescope 15 bore-sighted in the foregoing manner, the elevation angle is then set to the exact value precomputed for the selected satellite to be tracked, the instrument or telescope is slewed to the desired acquisition track angle, and the predicted acquisition angular velocity set on the main tracking drive which, in this case, may be the Graham Drive shown generally and schematically at 23 in FIG. 4.

The previously noted adjustment in azimuth is made particularly to set the polar axis of telescope 15 and hence tracking axis 3 into the plane containing the predicted maximum elevation, $E_{max}$, of the satellite and the zenith, Z. Electrical drive means for this adjustment is not necessary, as one-time settings are the usual case for each satellite. Next, the polar axis of telescope 15 is further adjusted in elevation by movement of the outer gimbal 13 about elevation axis 2. In practice, this is accomplished, first, by moving the elevation adjustment to its coarse or approximate setting through use of the motor-drive means indicated generally at 17 in FIGS. 4 and 5 of the drawings, which consists of the elevation motor 18, selsyn motor 18a, and reduction gearing shown generally at 19. Secondly, finer adjustment in elevation to the exact predetermined value is controlled by the controlling selsyn generator 20 which may be electrically interconnected to the selsyn motor 18a which, in turn, may be mechanically coupled to the armature of the slewing motor 18. The foregoing adjustment in elevation is made to a point above the point of maximum elevation of the satellite to be tracked in an amount precalculated for the selected satellite and corresponding to a tracking path having the best linear fit to the predicted path of the satellite, when considered iwth the offset angle of adjustment to be applied to the adjustment of the telescope 15 about offset axis 4. Electrical switch means at 21 in FIGS. 4 and 5 may be utilized to switch venier control of the observer-operator from the elevation motor-drive means 17 to a motorized drive for offset axis 4, if desired. In any event, initial adjustment in offset is made by physically pulling downward on the telescope 15 to the predetermined position.

Initial motion about the tracking axis 3 is accomplished by moving the telescope 15 and inner gimbal 14 by manually overpowering a friction clutch between the gimbal 14 and its mount to outer gimbal 13. This mount may be the worm-gear drive which is driven through a worm powered by the Graham variable speed transmission and brake controlling knob indicated in schematic form at 23 and 23a, respectively. This fraction clutch and worm-gear drive are not shown since they are a part of the standard Graham Drive and, as such, their details are apart from the present invention.

With the foregoing arrangement, precise adjustments of the outer gimbal 13 to a predetermined angle of elevation may be made by use of the elevation scale at 24 in FIG. 4, and adjustment of the telescope 15 and inner gimbal 14 to the precomputed angular value about tracking axis 3 for acquisition of the target, likewise, may be made by use of the tracking scale at 25 in FIG. 4. After the previously-described boresighting of the finder 16 with the main telescope 15 has been accomplished, and the predetermined values for azimuth, elevation, and offset axes 1, 2 and 4, respectively, have been placed on the mount 10, satellites known to be faint (usually distant) are acquired at track angles close to the midpoint, as low elevation atmospheric conditions can reduce image intensity below detection thresholds. The higher the satellite's perigee, the better the predictions, so in many of the faint-object cases the relative high power eyepiece of finder 16 is used for acquisition. On the other hand, however, satellites known to be bright (usually close) are acquired near the horizon, where apparent orbit displacement (from prediction errors) is at a minimum. In cases of highly unstable, bright satellites, acquisition is often by the unaided eye as such transits can miss even the 6° finder field.

As described hereinbefore, the tracking mount 10 of the present invention is initially put into operation by presetting the tracking axis 3, through adjustment of the yoke member 12, in the plane containing the point of maximum satellite elevation and the zenith. Next, the telescope 15 together with the outer gimbal 13 and inner gimbal 14 are adjusted in elevation about axis 2 to an initial point of culmination or maximum elevation, $E_{max}$, related to the predicted $E_{max}$ of the satellite to be tracked, but elevated a predetermined number of degrees above the predicted $E_{max}$. At this point, if no further adjustment were made, the present tracking mount would follow the great circle route or path, as in the case of the three-axis mount. However, in accordance with the teaching of the present invention, the great circle path thus followed would be elevated from 10° to 15°; however, by utilizing the fourth axis of the present invention; that is, by rotating the telescope 15 downwardly about the fourth axis 4 to an offset position, corresponding to a precalculated best linear fit between the path inherently tracked by the mount and the trajectory of the satellite, errors normally inherent in the great circle approximation of the three-axis mount may be reduced from as much as 10° to as low as $\frac{1}{10}°$ in fitting the path tracked by the satellite-tracking mount to the apparent path of the satellite. The actual number of degrees which the optic axis of the telescope 15 is to be elevated above the point of culmination of the orbiting satellite and the amount of declination or offset to be placed on the telescope 15 about axis 4 depends on the predicted trajectory of the satellite and iterative solution to pass the small circle path generated by the offset or fourth axis through the culmination point and one of the near horizon points. In one example, involving an examination of transits of the 1962 βα 2 which was an Agena B vehicle upper stage, the best linear fit was found to involve an offset angle of 12°50′, and the use of a horizon point near 10° elevation with an $E_{max}$ for this vehicle given as 21°12′, an elevation angle of 34°02′, obtained by adding 21°12′ to 12°50′, would be placed on the elevation axis 2 of the present tracking mount 10 in order to achieve the best linear fit for the path being tracked. Thus, with this vehicle, the outer gimbal 13 would be adjusted about elevation axis 2 to the aforesaid angle of 34°02′, and then telescope 15 would be adjusted in declination about axis 4 to offset angle equal to 12°50′. In this manner, the small circle resulting from use of the inventive axis 4 of the present mount would follow a path more nearly coinciding with the apparent path or trajectory of the selected satellite.

After adjusting the four axes of the present mount 10 to their precalculated values, the operator then observes the passage of the satellite under examination. If the target is observed to pass through the center of the field, tracking is commenced about axis 3. Initial acceptance of the target is had with the 6° field of the finder 16 and the image is followed until it crosses the vertical component of a cross-wire reticle. At this point, the Graham Drive motor indicated generally at 23 is actuated and the image of the satellite brought to the cross-wire intersection by manipulation of the drive rate through use of the rate controlling knob 23a and the elevation axis selsyn control generator 20 and motor-drive 17. The eyepiece turret of finder 16 is then rotated to change to the 1° field, and the recording equipment, as for example, the photometer 22, is turned on. Image centering throughout the balance of the transit may be controlled by varying the tracking rate and adjusting the elevation setting in one form of the invention. In another form of the invention, where motor-drive means may be used to automatically control adjustments of the telescope 15 about axis 4 through a selsyn control similar to the aforesaid elevation control, switch means 21 may be adjusted to provide selsyn control for automatic guiding of the telescope 15 about axis 4 to thereby provide more accurate and true cross-track motion at any point on the satellite trajectory.

If, on the other hand, the target is observed to be moving other than through the center of the field of view, additional adjustment about the elevation axis 2 is made until the target passes through the center of the field before any tracking about the axis 3 is begun. Where the fourth axis is motorized, the second, or elevation axis, is then left fixed in position, and all subsequent tracking is performed by motions about tracking axis 3 and offset axis 4 to minimize any excursions of the target orthogonal to the tracking axis. In any event, whether the axis 4 is motorized or not, the offset adjustment provided by use of the fourth axis of the tracking mount 10 of the present invention ensures a more accurate and reliable instrument mount which has an inherent tracking capability improved over standard mounts used at the present time and which also facilitates greatly simplified and more sensitive guiding control.

I claim:
1. A satellite-tracking mount comprising a fixed base element, optical instrument supporting and satellite-tracking means positioned on said fixed base element for initial adjustment in azimuth to the apparent path of the satellite to be tracked about a first axis and in elevation about a second axis orthogonal to said first axis to a first aiming position elevated a predetermined amount above the predicted point of maximum elevation for the selected satellite, optical instrument means supported on said satellite tracking means for movement therewith in elevation to a first aiming position and in tracking about a third axis orthogonal to said second axis, and sighting means movable for offsetting said optical instrument means to a second aiming position effecting tracking of the mount along a small circle path more nearly coinciding with the satellite path, and including a finder telescope mounted on the third axis of said optical instrument-supporting and satellite-tracking means for adjustment therewith in both azimuth and elevation and positioned in a parallelogram-mount arrangement with said optical instrument means to thereby facilitate boresighting with said optical instrument means and to simplify tracking and control of the mount.

2. A satellite-tracking mount as in claim 1, wherein said parallelogram-mount arrangement is interconnected between said optical instrument-supporting and satellite-tracking means and said optical instrument means and is adapted to move said optical instrument means about a fourth axis to an offset position equal in declination to the initial point of adjustment in elevation above the predicted point of maximum elevation to thereby align the axis of said optical instrument means on said second aiming position and directly on the predicted point of maximum elevation.

3. A satellite-tracking mount as in claim 2, said optical instrument-supporting and satellite-tracking means comprising a yoke member adjustably supported on said fixed base element for adjustment about a first, azimuth axis extending through said fixed base element, and load-supporting gimbal means mounted on said yoke member for rotation about a second, elevation axis extending through said yoke member in orthogonal relation to said first, azimuth axis, said optical instrument means being rotatably positioned on said load-supporting gimbal means and adapted for initial movement in elevation with said load-supporting means to the aforesaid first aiming position above the predicted point of culmination for the satellite to be tracked, and subsequent movement in tracking about a third axis orthogonal to said second, elevation axis and representing a great circle path approximating the track of the satellite, said optical instrument means being further adjustable within said gimbal means for movement about a fourth axis in declination to a depressed position relative to said third, tracking axis in an amount equal to the initial adjustment in elevation above the point of culmination to move the aiming of said optical instrument means from the first aiming position to an adjusted, second aiming position in direct alignment with the predicted point of maximum satellite elevation to thereby reduce the path tracked by the mount from the great circle normally followed in tracking about the third axis to a small circle nearly coinciding with the satellite trajectory.

4. A satellite-tracking mount as in claim 2, said optical instrument-supporting and satellite-tracking means comprising a load-supporting member for mounting said optical instrument means for movement in tracking therewith about a tracking axis orthogonal to said second, elevation axis, and means adjustably positioning said optical instrument means on said load-supporting member and adapted to move said optical instrument means downwardly relative to said tracking axis an amount precalculated for the selected satellite to thereby effect a finer adjustment in track nearly coinciding with the satellite path.

5. A satellite-tracking mount as in claim 3, said optical instrument-supporting and satellite-tracking means comprising a yoke member having upright arm portions and mounted for adjustment in azimuth about a first axis through said fixed base element, an outer gimbal rotatably positioned on the upright arm portions of said yoke member for adjustment in elevation to a point above the predicted point of maximum satellite elevation about a second axis extending in perpendicular relation to said azimuth axis, an inner gimbal supporting said optical instrument means for adjacent in track normally along a great circle path only approximating the path of the satellite, and means for reducing the great circle path followed by adjustment about the third axis only to a small circle path substantially coinciding with the satellite path at all points over a relatively wide range of track, said means comprising an optical instrument-intermediate supporting member interconnected with, and adjusting said optical instrument means to an offset position relative to the initial adjustment in elevation resulting from movement of said outer gimbal.

References Cited

UNITED STATES PATENTS

| | | | |
|---|---|---|---|
| 2,155,402 | 4/1939 | Clark | 250—203 X |
| 2,337,587 | 12/1943 | Brocky | 33—61 |
| 3,001,289 | 9/1961 | Carbonara | 33—61 |
| 3,121,605 | 2/1964 | Nunn | 33—61 X |
| 3,327,539 | 6/1967 | Moskowitz et al. | 33—61 |

HARRY N. HAROIAN, Primary Examiner